United States Patent [19]
Sewell

[11] Patent Number: 5,931,255
[45] Date of Patent: Aug. 3, 1999

[54] POWER TRANSFER ARRANGEMENT FOR A MACHINE

[75] Inventor: Andrew J. Sewell, Bardon Mill, United Kingdom

[73] Assignee: Caterpillar Inc., Peoria, Ill.

[21] Appl. No.: 08/853,396

[22] Filed: May 9, 1997

[51] Int. Cl.⁶ .................................................. B60K 17/00
[52] U.S. Cl. ........................ 180/374; 180/233; 180/248
[58] Field of Search .................................. 180/374, 233, 180/248, 249, 376

[56] References Cited

U.S. PATENT DOCUMENTS

| | | | |
|---|---|---|---|
| 2,125,441 | 8/1938 | Haltenberger | 180/374 |
| 4,147,263 | 4/1979 | Frederick et al. | 414/718 |
| 4,805,720 | 2/1989 | Clenet | 180/248 |
| 5,197,565 | 3/1993 | Sado | 180/248 |
| 5,595,398 | 1/1997 | Brown | 280/763.1 |
| 5,618,156 | 4/1997 | Brown | 414/694 |

FOREIGN PATENT DOCUMENTS

| | | |
|---|---|---|
| 2009968 | 8/1991 | Canada . |
| 0577388 | 1/1994 | European Pat. Off. . |
| 517282 | 1/1940 | United Kingdom . |
| 727917 | 4/1955 | United Kingdom . |
| 763437 | 12/1956 | United Kingdom . |
| 2137145 | 10/1964 | United Kingdom . |
| 2081656 | 2/1982 | United Kingdom . |
| 2161784 | 1/1986 | United Kingdom . |
| 2250246 | 3/1992 | United Kingdom . |
| 89/00972 | 2/1989 | WIPO . |
| 95/31615 | 11/1995 | WIPO . |

*Primary Examiner*—Christopher P. Ellis
*Attorney, Agent, or Firm*—Alan J. Hickman

[57] ABSTRACT

A power transfer arrangement has a transmission mounted on a prime mover of a machine and at a predetermined angle "b" relative to an elevational plane of a longitudinal machine axis. The prime mover is at a predetermined angle "a" relative to the longitudinal machine axis. A first drive shaft is connected to deliver rotary power between first and second spaced differentials mounted on and beneath a frame of the machine. A second drive shaft, at a predetermined angle "c" relative to the longitudinal centerline of the prime mover and at a predetermined angle "d" relative to the longitudinal machine axis, is connected to deliver rotary power between the prime mover and the differentials. The first and second drive shafts are elevationally beneath the frame and substantially in a transverse plane of the longitudinal machine axis. A transfer gear case of the second differential transfers rotary power from the second drive shaft to the first drive shaft.

12 Claims, 5 Drawing Sheets

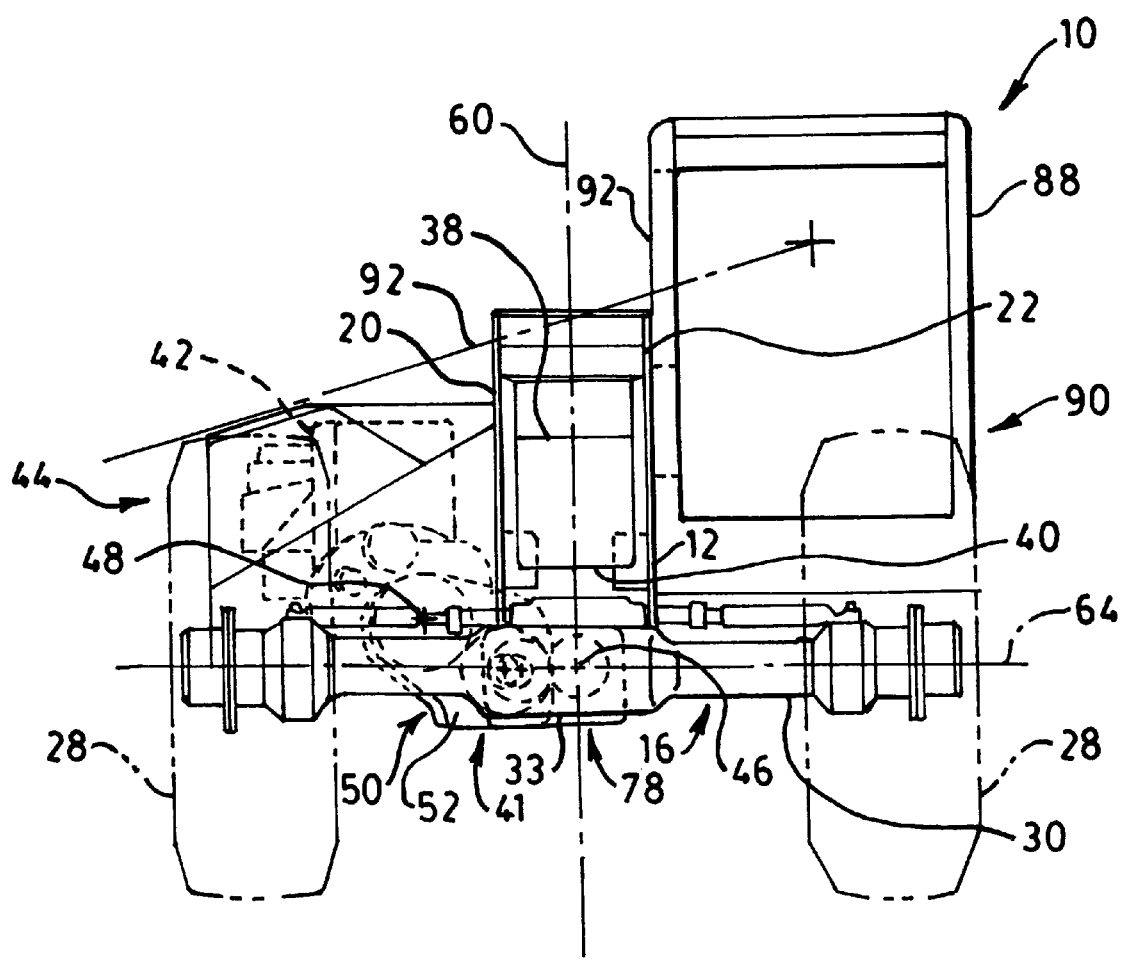
Fig_3.

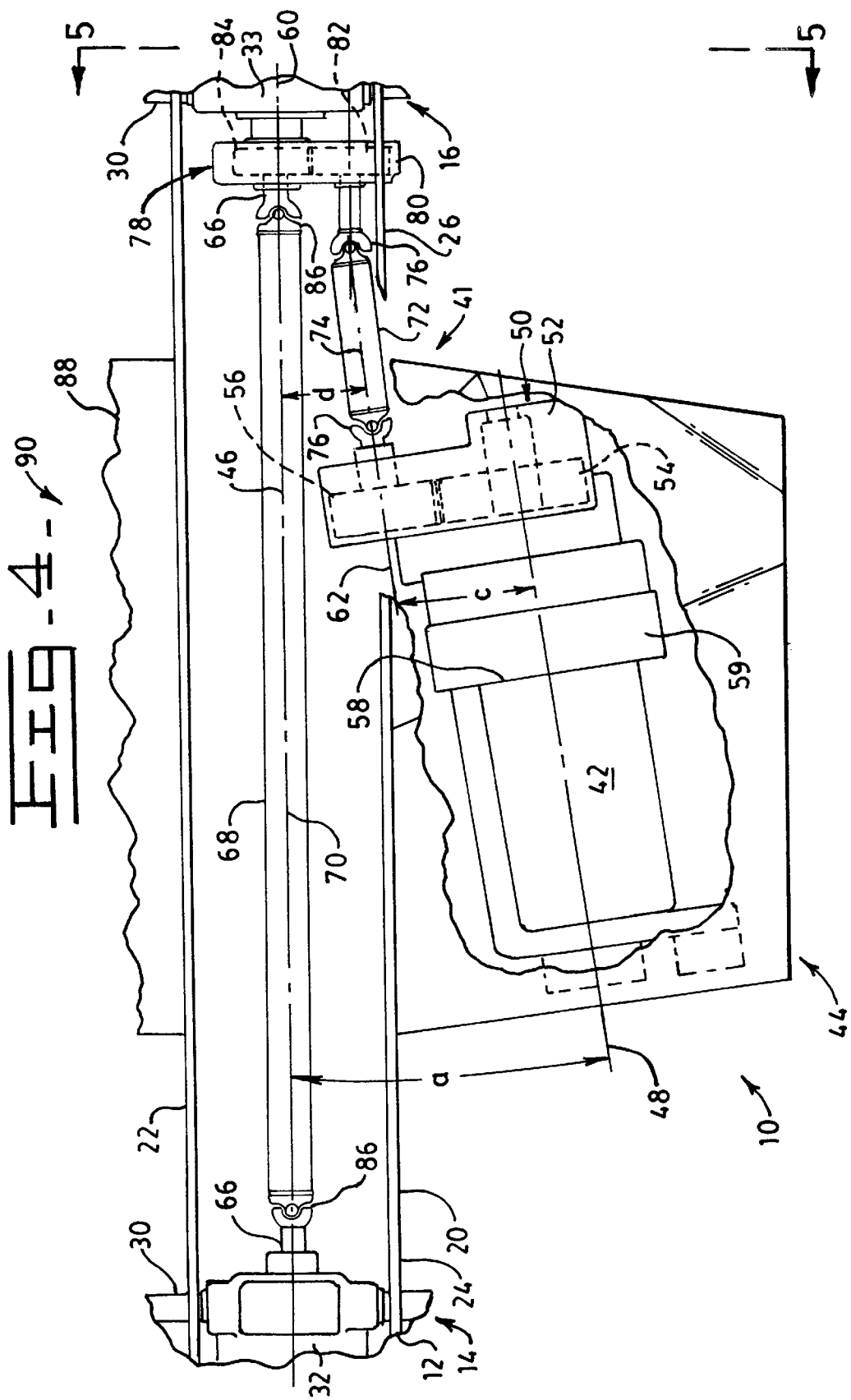

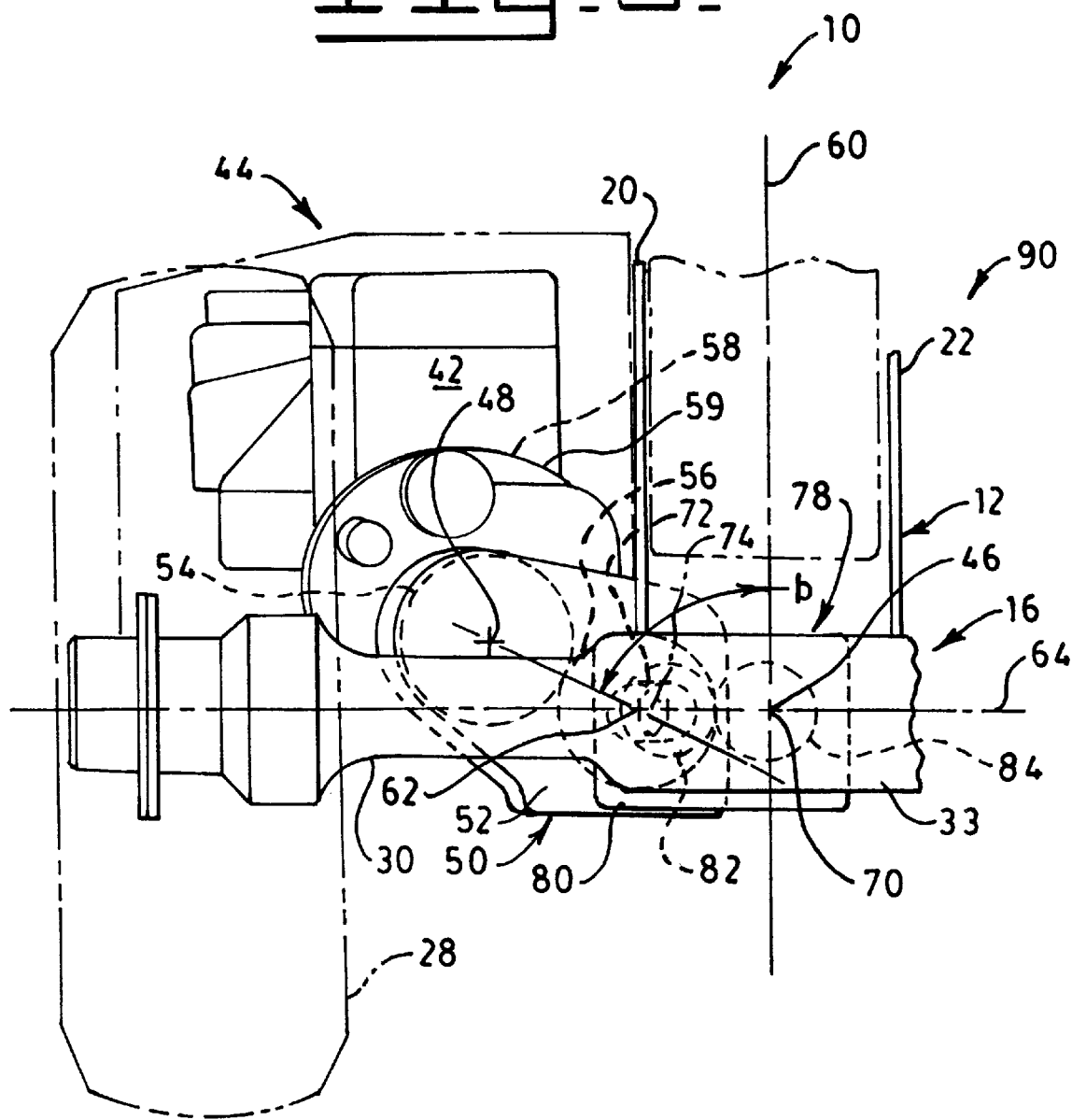

POWER TRANSFER ARRANGEMENT FOR A MACHINE

TECHNICAL FIELD

This invention relates to a power transfer arrangement for a work machine and more particularly to a power transfer arrangement having a prime mover oriented at a predetermined angle relative to a longitudinal axis of the work machine and a prime mover mounted transmission oriented at a predetermined angle relative to an elevational plane of the longitudinal axis and extending beneath a frame of the work machine.

BACKGROUND ART

Work machines, for example, machines of the type having a boom pivotally connected at a first end of the boom to a first end portion of a machine frame and extending longitudinally of the work machine past a second end of the frame have been known for quite some time. Such booms typically have an implement mounted on a second end for performing an intended work function. Often an operator's station is located to a first side of the boom and the engine is located to a second side of the boom. This machine configuration provides excellent visibility from the operators station in three of four possible directions. However, the visibility in the fourth direction is somewhat obstructed by the height of the engine compartment shrouding the engine.

Work machines of the type described above often have a high center of gravity which negatively affects load carrying capacity and the amount of work being performed for a given operation. This high center of gravity is the result of having one or more of a massive vehicle frame, a large power transfer gear case mounted beneath the frame and oriented transversely relative to the machine, and the engine mounted on a sub-frame located beneath the machine frame.

The amount of space available to access components of the engine is a function of the width of the machine, determined by the distance between sides of opposite wheel pairs, and the distance between the boom, and in some cases a centrally elongated frame portion, and one of the wheel sides. It is particularly important to keep the engine (including the engine compartment when provided) within the width of the machine in order to maximize stability and maneuverability. In doing so, the distance between the boom and/or central frame and the engine is extremely tight making access to engine components, such as, a turbocharger, alternator, oil and/or gas filter located therebetween difficult. Given the various prior power transfer arrangements, including, transmission, transfer gear case, differentials and the like available, engine repositioning is not possible due to interference with the frame or boom.

In prior power transfer arrangements there is often provided a transfer gear case which has a multitude of gears, bearings and associated parts. Such transfer gear cases extend from a location substantially in line with the output shaft of the transmission to a location substantially transversely midway between the pairs of spaced apart opposite wheels. Several drive shafts are provided to connect the transmission to the transfer gear case and the transfer gear case to each of the front and rear differentials associated with each pair of wheels of the machine. Although, such a power transfer arrangement is effective in operation, it wastes natural resources in requiring an excessive number of parts, is costly and prone to wear.

The present invention is directed to overcoming one or more of the problems as set forth above.

DISCLOSURE OF THE INVENTION

A transfer arrangement for transmitting rotary power from a prime mover to a ground engaging member of a work machine is provided. The machine has a frame with a pair of spaced longitudinally extending and elevationally oriented side members, and first and second longitudinally spaced end portions. A longitudinal axis extends longitudinally relative to the longitudinal extension of the machine frame. A prime mover having a longitudinal centerline and an end is connected to the machine frame. The prime mover is located to a first side of the machine frame and the longitudinal centerline of the prime mover is located at a predetermined angle relative to the longitudinal axis. A transmission has an input gear and an output gear. The housing is connected to the end of the prime mover and the input gear is adapted to transfer rotary power from the prime mover to the output gear. The transmission is at a predetermined angle relative to the prime mover and extends to a location at which the output gear is elevationally beneath the machine frame. A first differential is connected to the first end portion of the machine frame and is located beneath the first end portion of the machine frame. The second differential is connected to the second end portion of the machine frame and is located beneath the second end portion of the machine frame. A first drive shaft is located between and connected to the first and second differentials. The first drive shaft has a longitudinal axis which extends substantially parallel to the longitudinal axis of the machine frame. The first drive shaft transfers rotary power between the first and second differentials. A second drive shaft has a longitudinal axis and is connected between the output gear of the transmission and the second differential. The second drive shaft is adapted to transfer rotary power between the output gear and the second differential. The second drive shaft longitudinal axis is at a first predetermined angle relative to the longitudinal centerline of the prime mover and at a second predetermined angle relative to the longitudinal axis of the vehicle frame.

The angling of the prime mover relative to the longitudinal axis provides additional clearance space between the frame and the prime mover and the angling of the transmission relative to an elevational plane of the longitudinal axis enables substantial lowering of the prime mover and improved visibility from the operator's station mounted on the frame opposite the prime mover.

Angling of the transmission enables the transmission to be tucked beneath the frame so that the longitudinal axis of the first and second drive shafts are substantially parallel to a transverse plane of the longitudinal axis which is oriented transverse relative to the elongate frame.

BRIEF DESCRIPTION OF THE DRAWINGS

FIG. 3 is a diagrammatic front elevational view taken along lines 3—3 of FIG. 2;

FIG. 4 is an enlarged diagrammatic top plan view of FIG. 1 with portions broken away and removed to show the power transfer arrangement in greater detail; and FIG. 5 is an enlarged diagrammatic front elevational view of FIG. 3, taken along lines 5—5, with portions removed and broken away to show the power transfer arrangement in greater detail.

BEST MODE FOR CARRYING OUT THE INVENTION

Figure 1:
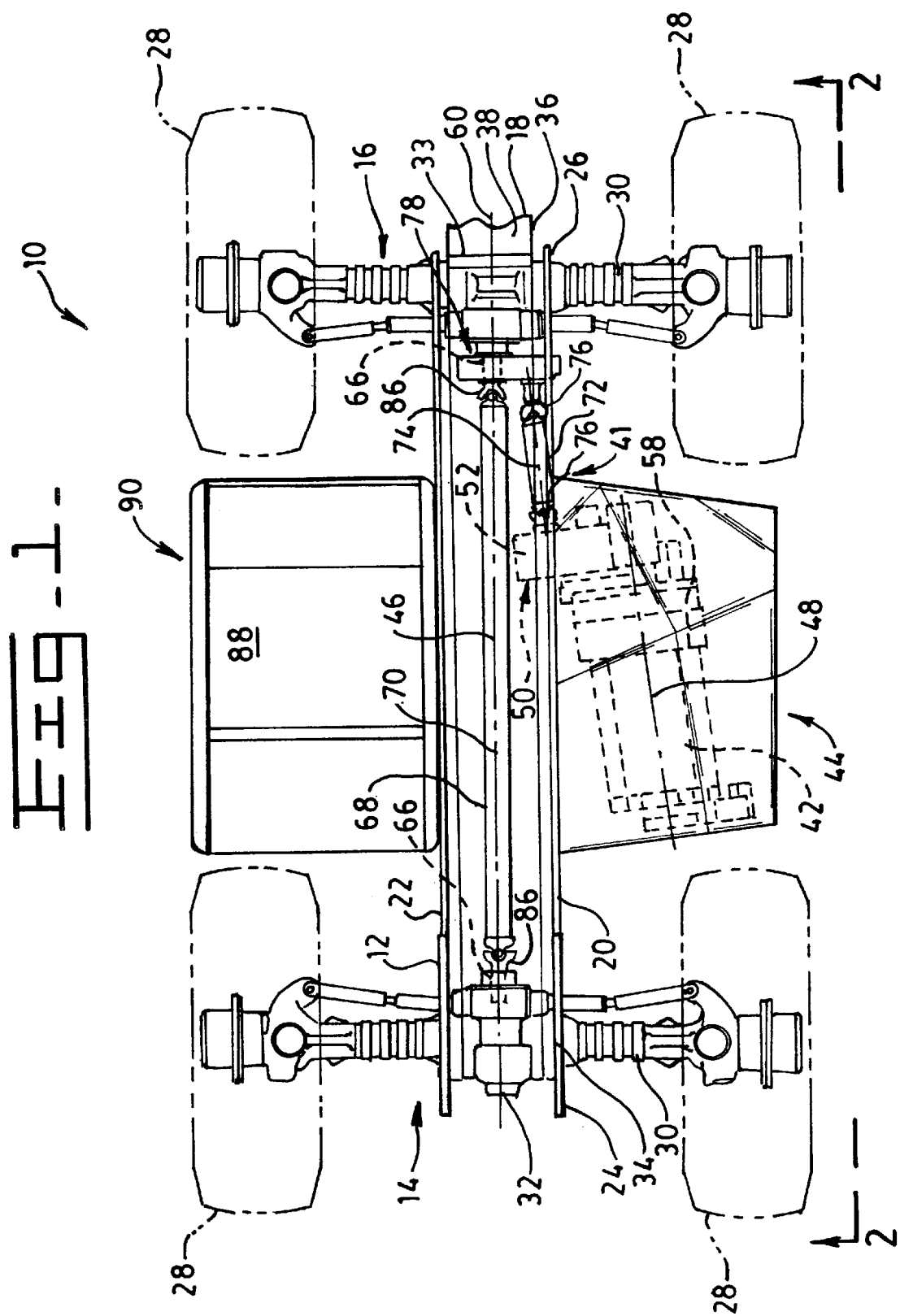
FIG. 1 is a diagrammatic top plan view of an embodiment of the present invention showing the power transferring arrangement mounted on a work machine.

With reference to the drawings, a work machine 10, in particular a telescopic handler, is partially shown. The work machine has a frame 12, first and second drive axle assemblies 14,16, and a boom 18. The frame has an elongated configuration defined by first and second substantially parallel spaced apart elevationally oriented side members 20,22 and first and second spaced apart end portions 24,26. It should be noted that other work machines, for example, loaders, non-telescopic handlers, combination loader handlers and the like are considered equivalents and within the scope of this invention.

The first and second drive axle assemblies 14,16 each have a pair of spaced apart rotatable ground engaging members 28, for example, wheel assemblies, and an axle housing 30. The first and second drive axle assemblies 14,16 have respective first and second differentials 32,33 disposed within the axle housing 30 at a location between the ground engaging members 28. The first and second differentials 32,33 include a gearing arrangement, for example, planetary gearing arrangement of a conventional well known design. The ground engaging members 28 of each pair are rotatably connected to the axle housings 30 in a conventional manner, and rotate in response to rotation of an axle shaft (not shown) connected thereto. The axle shafts are connected to the differentials 32,33 and are responsive to rotation the differentials 32,33 in a conventional and well known manner. The first and second differentials 32,33 each have a rotatable input shaft 66 for purposes of driving the ground engaging members 28. The first and second axle assemblies 14,16 are connected at spaced apart locations to and beneath the first and second end portions 24,26, respectively, of the frame 12 and extend transverse relative to the a longitudinal extension of the frame 12. Preferably, the differentials 32,33 are located transversely centrally beneath and connected to the frame 12. The ground engaging members 28 are substantially equally spaced from a longitudinal axis 46 extending longitudinally relative to the frame 12.

Figure 2:
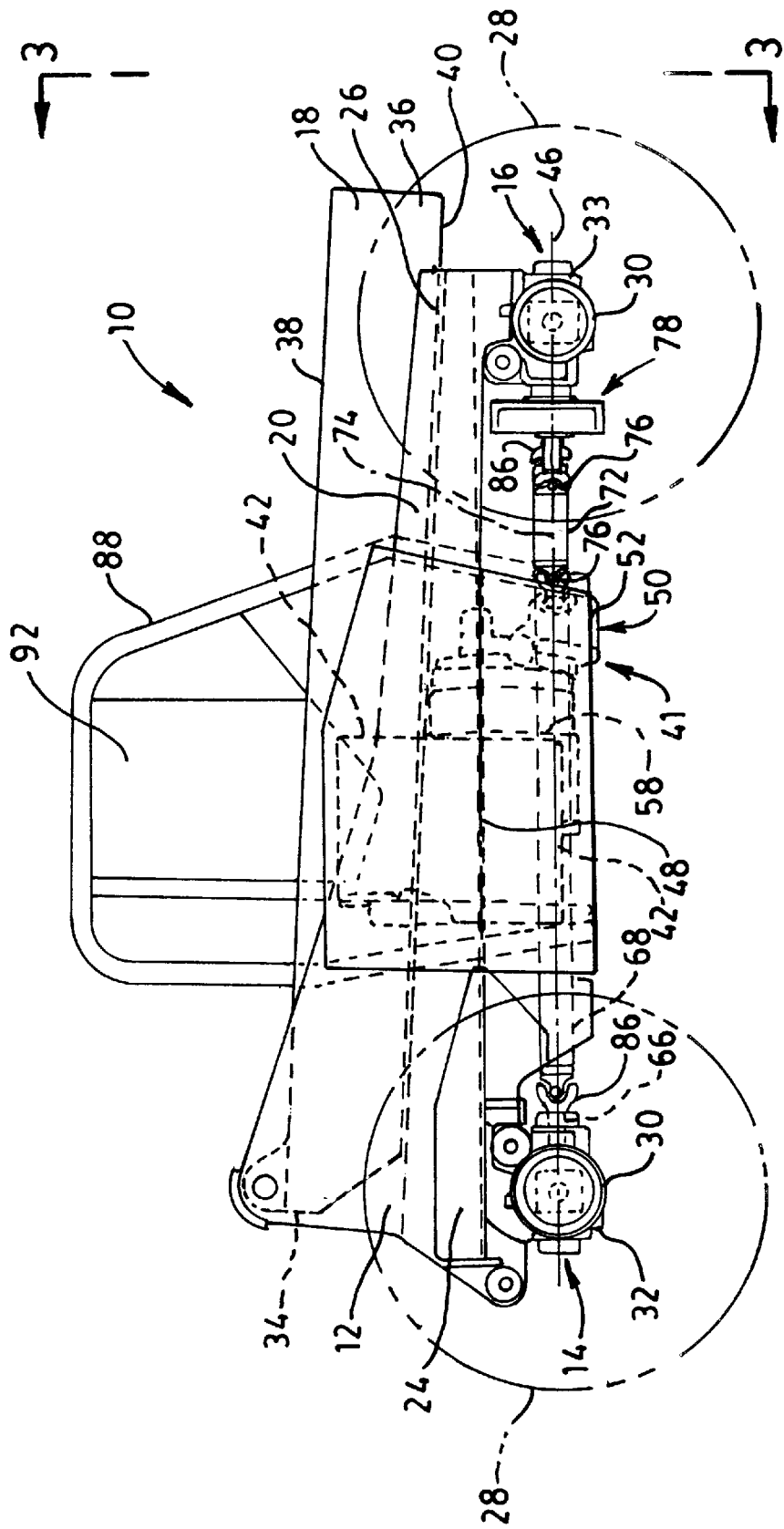
FIG. 2 is a diagrammatic side elevational view of FIG. 1 taken along lines 2—2 of FIG. 1.

In the embodiment shown, the boom 18 has first and second spaced end portions 34,36. The first end portion 34 is pivotally connected to the first end portion 24 of the frame 12 and the second end portion 36 extends past the second end portion 26 of the frame 12. The boom 18 may have a telescopic portion (not shown) which is slidably extensibly movable in a conventional well known manner. The boom 18 has top and bottom sides 38,40 and is pivotally movable about the pivotal connection between first and second pivotally spaced positions. The boom 12 is nested between and spaced from the first and second side members 20,22 at the first position (FIG. 2) and spaced from being nested between the first and second side members 20,22 at the second position. Movement between the first and second positions is achieved by way of hydraulic jacks (not shown) in a conventional manner.

As best seen in FIGS. 4 and 5, the work machine 10 has a transfer arrangement 41 for transferring rotary power from a prime mover 42, for example, an engine, to the ground engaging members 28 of the work machine 10. The prime mover is substantially upright and located to a first side 44 of the frame 12 and to the longitudinal axis 46 extending longitudinally relative to the longitudinal extension of the frame 12. The prime mover 42 has a longitudinal centerline 48 and the prime mover 42 is connected to the frame 12. The longitudinal centerline 48 is at a predetermined angle "a" of between 4 and 12 degrees relative to the longitudinal axis 46 and preferably a predetermined angle "a" of 8 degrees. As suggested earlier, the angle "a" of the prime mover 42 is significant in providing access to the prime mover 42 between the centrally located frame 12 and the prime mover 42. Too great an angle "a" places the prime mover 42 outside the envelope of the machine 10 defined by the ground engaging members 28. As will be seen during further discussion, this angle "a" is also significant in minimizing drive shaft angles and thereby promoting extended life of the associated componentry.

The power transfer arrangement 41 includes a transmission 50. The transmission 50 has a housing 52, and at least an input gear 54, and an output gear 56. The housing is connected to an end 58 of the prime mover 42 and rigid relative thereto. As shown, the transmission may be connected to a torque converter 59 of conventional and well known design. The input gear 54 is rotatable in response to rotation of a rotary member, such as a crank shaft (not shown), of the prime mover 42 in a conventional manner and transfers rotary motion to the output gear 56 in a conventional manner. The transmission 50 is tilted at a predetermined angle "b" relative to an elevationally oriented plane 60 of the longitudinal axis 46. The transmission is also at an angle to the substantially upright prime mover 42 and the longitudinal centerline of the prime mover is substantially parallel to the transverse plane 64. The prime mover 42 may be angled slightly, 10 degrees or so, relative to the vertical. The elevational plane 60 is preferably vertical and the longitudinal axis 46 lies in the plane 60. The angle "b" is between an angle of between 30 and 75 degrees and preferably 60 degrees. The transmission 50, an particularly the housing 50 thereof, extends to a location beneath the frame 12 so that a center axis 62 of the output gear 56 lies in a transversely oriented plane 64 transverse relative to the frame 12. Preferably, the first and second drive axle assemblies 14,16, the spaced apart input shafts 66 and the longitudinal axis 46 axially lie in the plane 64. As can be seen, the longitudinal axis 46 passes through a center of rotation of the input shafts 66.

A first drive shaft 68 has a longitudinal axis 70 and is located between and connected to the first and second differentials 32,33. In particular, the first drive shaft 68 is connected to rotate the input shafts 66 of the first and second differentials 32,33. The first drive shaft 68 is substantially parallel to the transverse plane 64. It is preferred that the longitudinal axis 70 lies substantially in the transverse plane 64. It is preferred that the first drive shaft 68 is at a slight angle to the transverse plane 64 so as to move slightly for lubrication purposes and extended life.

A second drive shaft 72 has a longitudinal axis 74 and is connected between the output gear 56 of the transmission 50 and the second differential 33. The second drive shaft 72 transfers rotary power and motion between the output gear 56 and the second differential 33. In particular, the second drive shaft 72 transfers rotary motion from the output gear 56 to the input shaft 66 of the second differential 33. The longitudinal axis 74 of the second drive shaft 72 is at a first predetermined angle "c" relative to the longitudinal centerline 48 of the prime mover 42 and at a second predetermined angle "d" relative to the longitudinal axis 46 of the machine 10. It is desirable that the first predetermined angle "c" is between 3 and 5 degrees and the second angle "d" is between 3 and 5 degrees. It is preferred that the first and second angles "c" and "d" are equal in magnitude, 4 degrees, so that the velocity at opposite ends of the second drive shaft is constant. The longitudinal axis 74 is substantially parallel to the transverse plane 64 and preferably lies in the transverse plane 64. In the preferred embodiment of the invention, the longitudinal axis 46 and the longitudinal axis 70 of the first drive shaft 68 are substantially coincident.

A transfer gear case 78 is connected to the axle housing 30 associated with the second differential 33 and located beneath the frame 12. The transfer gear case 78 has a housing 80 and first and second transfer members, hereinafter referred to as first and second transfer gears 82,84, connected to the housing and rotatable relative to the housing 80. The housing 80 is mounted on the second drive axle assembly 16 adjacent the second differential 33 and fixed from movement relative to the second differential 33. This mounting may be by way of a flange and threaded fasteners (not shown) or any other suitable known mounting. It is to be noted that the housing 80 of the transfer gear case 78 may be an integral part of the axle housing 30 rather than a separate unit. The transfer gear case 78 is disposed about the input shaft 66 of the second differential 33. The first transfer gear 82 is connected to the second drive shaft 72 and the second transfer gear is connected to the input shaft 66 of the second differential 33. As can be seen, the first and second transfer gears 82,84 are each rotatable about an axis of rotation lying in the transverse plane 64. The transfer gears 82,84 may be replaced by a suitable substitute, such as, a belt or chain drive arrangement having pulleys and cogs, respectively, without departing from the spirit of the invention.

The first drive shaft 68 is connected to and between the second transfer gear 84 of the transfer gear case 78 and the rotary input shaft 66 of the first differential. In particular, a universal joint 76, or other suitable joint type, is provided at the connection of the second drive shaft 72 to the output gear 56 of the transmission 50 and at the connection of the second drive shaft 72 to the first transfer gear 82. Also, a universal joint 86, or other suitable joint type, is provided at the connection of the first drive shaft 68 to the input shaft 66 of the first differential 32 and at the connection of the first drive shaft 68 to the second differential 33. In particular, the universal joint 86, at the connection to the second differential 33, is connected to the second transfer gear 84. It should be recognized that this connection may be to the input shaft 66 of the second differential 33 without departing from the spirit of the invention.

An operator's station 88 is connected to the machine frame 12. The operator's station 88 is located to a second side 90 of the frame 12 opposite the first side 44 at which the prime mover 42 is located and to the second side 90 of the longitudinal axis 46. The operator's station 88 has a window opening 92 on a side facing the prime mover 42. The line of sight 94, of a typical sized vehicle operator, through the window opening 92 is substantially improved by the lowering of the prime mover 42 and the surrounding enclosure.

Industrial Applicability

With reference to the drawings, and in operation, the power transfer arrangement 41 transfers rotary power from the prime mover 42 to the transmission 50. The transmission 50 transfers rotary power to the transfer gear case 78 mounted on the second drive axle assembly 16 beneath the frame 12 by way of the second drive shaft 72. The first drive shaft 14 transfers rotary power between the transfer gear case 78 and the first differential 32. The first and second differentials 32,33 transfer rotary motion of the first and second drive shafts 68,72 by way of the axle shafts to the ground engaging members 28.

The transmission being at the predetermined angle "b" relative to the elevational plane 60 enables the transmission 50 to be partially tucked beneath the frame 12 so that the output from gear 56 is beneath the frame 12 and in as close proximity as possible to the first drive shaft 68 in order to minimize the angles "c" and "d" of the second drive shaft 72 and thereby extend component life. This also allows for the transfer gear case 78 to be relatively smaller in size than conventional transfer gear cases, to be mounted on the second differential 33 in a simple manner, and to have fewer components than existing transfer gear cases.

Having the transmission 50 at the angle "b" enables the prime mover 42 to be lowered as the elevational distance between the input and output axes 48 and 62 is reduced (the distance between the axes is based on the gear ratio and fixed). Having a portion of the transmission 50 beneath the frame 12 also promotes prime mover 42 lowering and improved operator visibility in the direction of the prime mover from the operator's station 88.

Having a portion of the transmission 50 beneath the frame 12 also allows the prime mover 42 to be placed at angle "a" relative to the longitudinal axis 46 which increases the amount of space between the prime mover 42 and the frame 12 and improved access to that area of the prime mover 42.

Since the first and second drive shafts 68,72 lie substantially in the same transverse plane 64 extreme compounded drive shaft angles are eliminated. Having the first and second axle assemblies 14,16 in substantially the same plane 64 further simplifies the design and promotes extended life and serviceability.

The power transfer arrangement 41, therefore, improves the efficiency of operation of the machine 10 by improving the visibility in the direction of the prime mover for the operator. The lowering of the prime mover 42 and moving it as close to the longitudinal axis 46 of the machine 10 as practicable results in a lower of center of gravity of the machine 10 and better machine stability.

Other aspects, objects and advantages of this invention can be obtained from a study of the drawings, the disclosure and the appended claims.

I claim:

1. A transfer arrangement for transmitting rotary power from a prime mover to a ground engaging member of a work machine, comprising:

a machine frame having a pair of spaced longitudinally extending and elevationally oriented side members, and first and second longitudinally spaced end portions;

a longitudinal axis extending longitudinally relative to the longitudinal extension of the machine frame;

a prime mover having a longitudinal centerline, an end, and being connected to the machine frame, said prime mover being located to a first side of the machine frame and said longitudinal centerline of the prime mover being located at a predetermined angle relative to the longitudinal axis of said longitudinally extending machine frame;

a transmission having a housing, an input gear and an output gear, said housing being connected to said end of the prime mover and said input gear being adapted to transfer rotary power from said prime mover to said output gear, said transmission being at a predetermined angle relative to said prime mover and extending to a location at which said output gear is elevationally beneath said machine frame;

a first differential connected to the first end portion of the machine frame and being located beneath the first end portion of the machine frame;

a second differential connected to the second end portion of the machine frame and being located beneath the second end portion of the machine frame;

a first drive shaft located between and connected to the first and second differentials, said first drive shaft having a longitudinal axis, said first drive shaft longitudinal axis extending substantially parallel to the longitudinal axis of the machine frame, said first drive shaft transferring rotary power between the first and second differentials;

a second drive shaft having a longitudinal axis and being connected between the output gear of the transmission and the second differential, said second drive shaft being adapted to transfer rotary power between the output gear and the second differential, said second drive shaft longitudinal axis being at a first predetermined angle relative to the longitudinal centerline of the prime mover and at a second predetermined angle relative to the longitudinal axis of the vehicle frame.

2. A transfer arrangement, as set forth in claim 1, including a plane transverse to said longitudinal frame, said longitudinal axis lying in said transverse plane, and said longitudinal axis of the first and second drive shafts being substantially parallel to said transverse plane.

3. A transfer arrangement, as set forth in claim 2, wherein said longitudinal axis of the first and second drive shafts lie substantially in the transverse plane.

4. A transfer arrangement, as set forth in claim 2, wherein said first predetermined angle is between 3 and 5 degrees.

5. A transfer arrangement, as set forth in claim 4, wherein the second predetermined angle is between 3 and 5 degrees.

6. A transfer arrangement, as set forth in claim 2, wherein the first and second predetermined angles are each substantially 4 degrees.

7. A transfer arrangement, as set forth in claim 5 wherein the predetermined angle of the centerline of the prime mover is between 4 and 12 degrees.

8. A transfer arrangement, as set forth in claim 3, wherein said first and second differentials each have a rotary input shaft, said rotary input shafts being spaced apart and said longitudinal axis passing through a center of rotation of the input shafts.

9. A transfer arrangement, as set forth in claim 8, including a transfer case having a housing and first and second transfer members connected to said housing and rotatable relative thereto, said housing being connected to the second differential, located beneath said frame, and fixed from movement relative thereto, said first transfer member being connected to the second drive shaft and said second transfer member being connected to said rotary input shaft of the second differential.

10. A transfer arrangement, as set forth in claim 9, wherein said first drive shaft is connected to and between the second transfer member of the transfer case and the rotary input shaft of the first differential.

11. A transfer arrangement, as set forth in claim 10, including an operators station connected to said machine frame and located at a second side of the frame opposite said first side.

12. A transfer arrangement, as set forth in claim 11, including a boom having a top side and being pivotally connected to said frame, said boom being pivotally moveable relative to said frame between first and second pivotally spaced positions, said boom being nested between the first and second side members of the vehicle frame at the first position, and said prime mover being elevationally beneath the top side of said boom at the first position.

* * * * *